United States Patent
De France et al.

(10) Patent No.: US 10,574,042 B2
(45) Date of Patent: Feb. 25, 2020

(54) SPACER ASSEMBLY FOR CONDUCTOR BUNDLE

(71) Applicant: Hubbell Incorporated, Shelton, CT (US)

(72) Inventors: Robert Victor De France, Poughkeepsie, NY (US); Daniel David Dobrinski, Hillsboro, NH (US)

(73) Assignee: Hubbell Incorporated, Shelton, CT (US)

( * ) Notice: Subject to any disclaimer, the term of this patent is extended or adjusted under 35 U.S.C. 154(b) by 518 days.

(21) Appl. No.: 15/232,380

(22) Filed: Aug. 9, 2016

(65) Prior Publication Data

US 2016/0352086 A1    Dec. 1, 2016

Related U.S. Application Data

(63) Continuation of application No. 13/473,987, filed on May 17, 2012, now Pat. No. 9,412,493.

(60) Provisional application No. 61/494,501, filed on Jun. 8, 2011, provisional application No. 61/493,592, filed on Jun. 8, 2011.

(51) Int. Cl.
| | | |
|---|---|---|
| *H02G 7/12* | (2006.01) | |
| *H02G 3/04* | (2006.01) | |
| *H01B 7/17* | (2006.01) | |
| *H01B 7/40* | (2006.01) | |
| *H02G 1/14* | (2006.01) | |

(52) U.S. Cl.
CPC ............. *H02G 3/0406* (2013.01); *H01B 7/17* (2013.01); *H01B 7/40* (2013.01); *H02G 1/14* (2013.01); *H02G 7/12* (2013.01); *Y10T 29/49194* (2015.01)

(58) Field of Classification Search
CPC .. H02G 7/17; H02G 7/40; H02G 7/14; H02G 7/12; H02G 3/0406; H02G 1/14; Y10T 29/532; Y10T 29/49194; Y10T 29/49826; H01B 7/17; H01B 7/40
USPC .......................... 29/868, 825, 745, 747, 729
See application file for complete search history.

(56) References Cited

U.S. PATENT DOCUMENTS

| | | | | |
|---|---|---|---|---|
| 912,277 | A * | 2/1909 | Benson .................... | F16C 11/04 403/161 |
| 2,915,580 | A * | 12/1959 | Fletcher ................... | H02G 7/12 174/43 |
| 3,055,623 | A * | 9/1962 | Becker ..................... | H02G 7/12 248/61 |
| 3,743,762 | A * | 7/1973 | Annas ....................... | H02G 7/12 174/146 |
| 3,870,815 | A * | 3/1975 | Hawkins ................ | H02G 7/125 174/42 |

(Continued)

FOREIGN PATENT DOCUMENTS

DE            9112701         11/1993

*Primary Examiner* — Peter Dungba Vo
*Assistant Examiner* — Kaying Kue
(74) *Attorney, Agent, or Firm* — Michael Best & Friedrich, LLP

(57) ABSTRACT

A spacer assembly includes first and second clamping bodies. The first clamping body has a first slot therein and the second clamping body has an opening. A fastener is received by the first clamping body slot and the second clamping body opening to secure the first clamping body to the second clamping body such that rotation of the fastener moves the fastener in the first clamping body slot to move the first clamping body relative to the second clamping body.

18 Claims, 20 Drawing Sheets

(56) References Cited

U.S. PATENT DOCUMENTS

| | | | | |
|---|---|---|---|---|
| 3,895,409 A * | 7/1975 | Kwatonowski | ........ | B65D 67/00 |
| | | | | 16/2.1 |
| 3,924,055 A * | 12/1975 | Moore | ...................... | H02G 7/12 |
| | | | | 174/40 R |
| 3,925,595 A * | 12/1975 | Hawkins | ................ | H02G 7/125 |
| | | | | 174/42 |
| 3,963,855 A * | 6/1976 | Hawkins | .................. | H02G 7/12 |
| | | | | 174/40 R |
| 4,525,596 A * | 6/1985 | Diana | .................... | H02G 7/125 |
| | | | | 174/146 |
| 6,448,503 B1 * | 9/2002 | McKinnon | ............... | H02G 7/12 |
| | | | | 174/146 |
| 7,677,933 B2 * | 3/2010 | Copper | .................... | H01R 4/38 |
| | | | | 174/94 S |
| 8,203,074 B2 * | 6/2012 | Goch | ....................... | H02G 7/08 |
| | | | | 174/41 |
| 9,093,202 B2 * | 7/2015 | Chan | ........................ | H02G 7/12 |
| 9,412,493 B2 * | 8/2016 | De France | ............... | H02G 7/12 |
| 9,570,216 B2 * | 2/2017 | Chan | ........................ | H02G 7/12 |
| 10,374,407 B2 * | 8/2019 | DeFrance | ............... | H02G 7/08 |
| 2005/0260034 A1 * | 11/2005 | Arbona | ................ | B62D 29/048 |
| | | | | 403/408.1 |
| 2008/0173462 A1 * | 7/2008 | Whapham | .............. | H02G 7/125 |
| | | | | 174/42 |
| 2012/0305290 A1 * | 12/2012 | De France | ............... | H02G 7/12 |
| | | | | 174/146 |

* cited by examiner

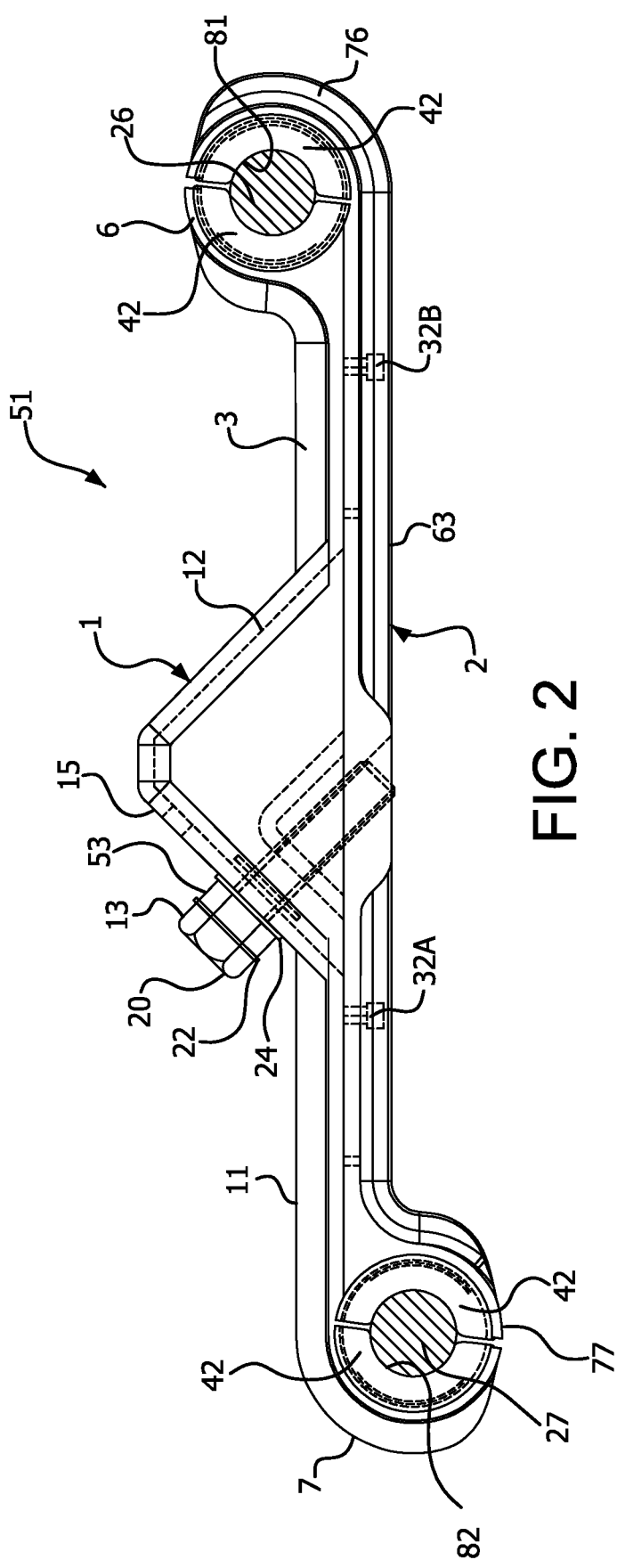
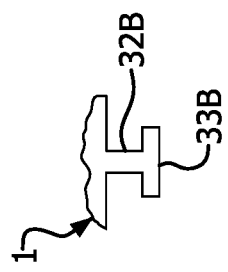
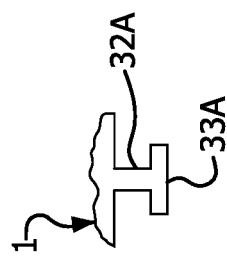
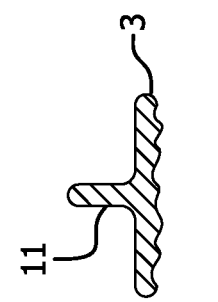
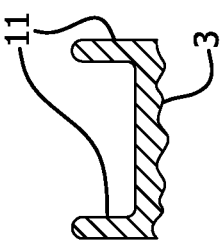

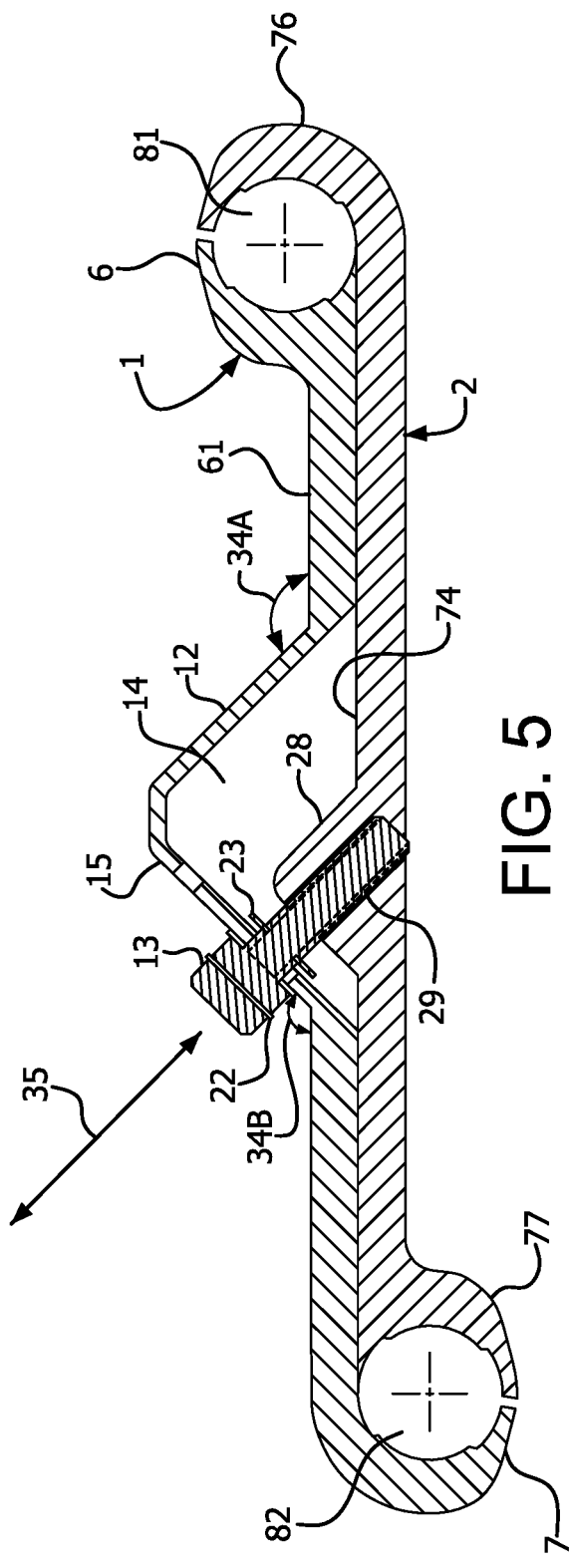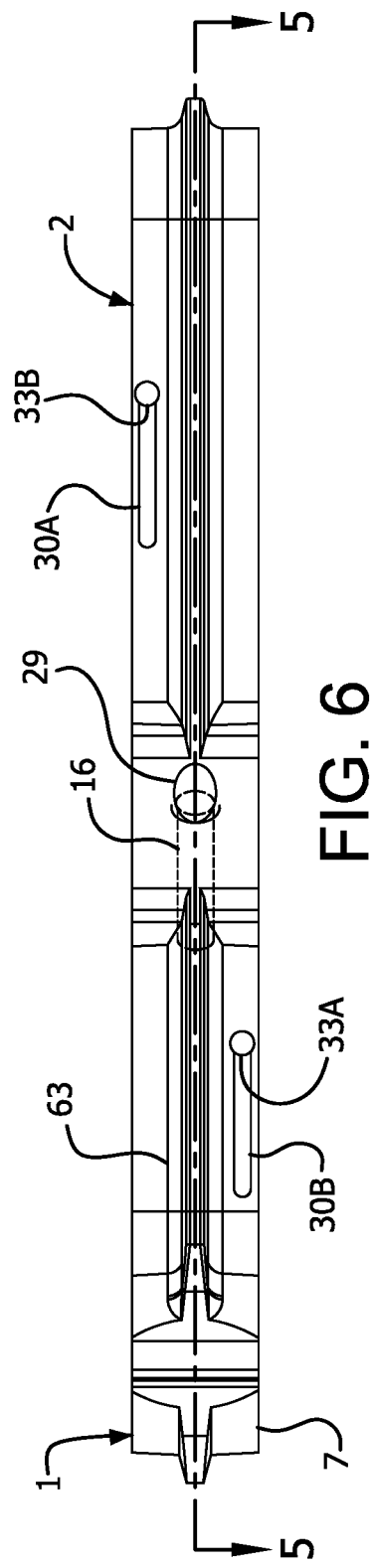

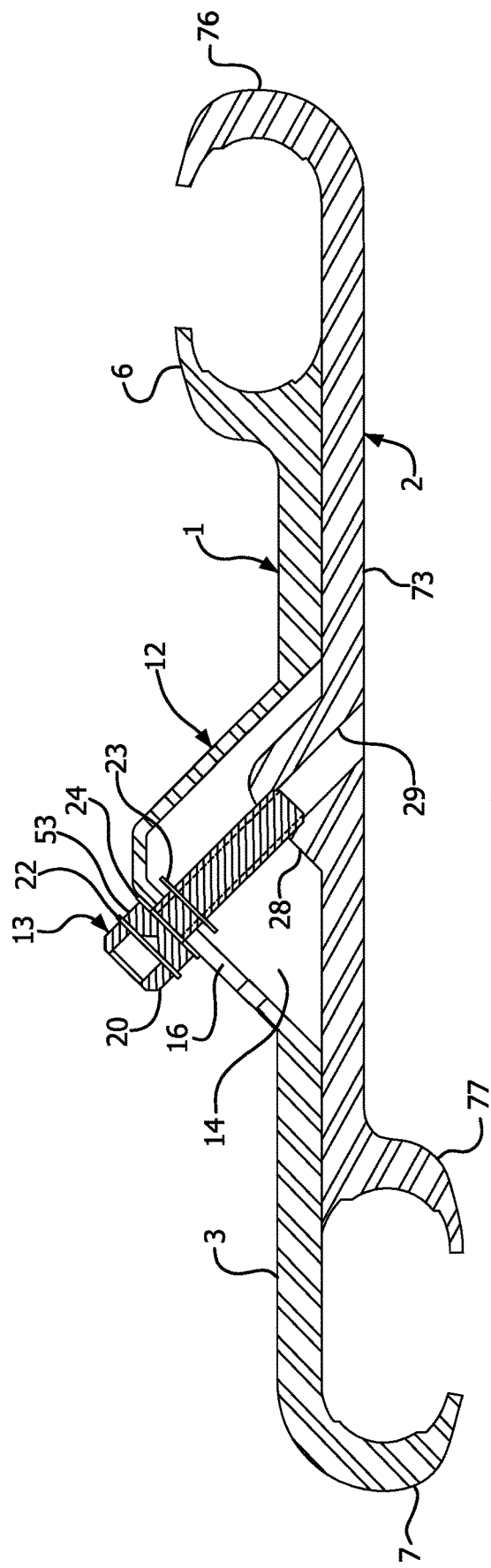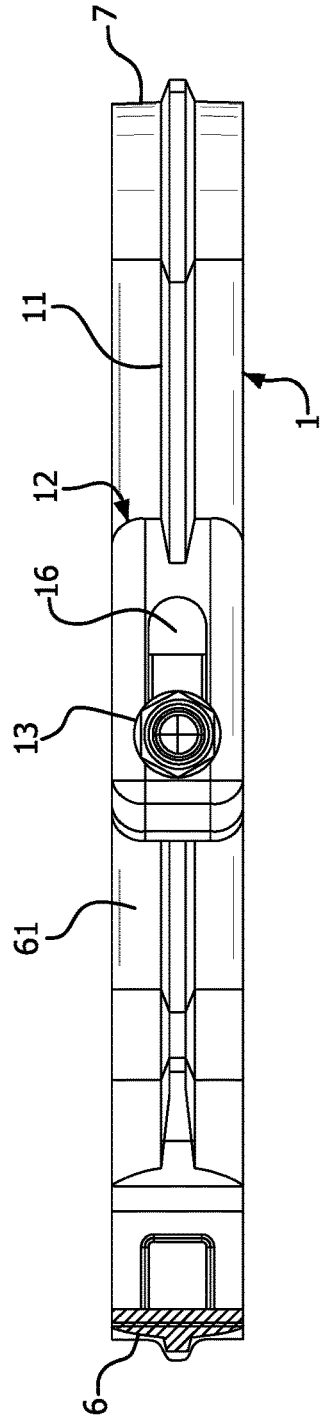
FIG. 5A
FIG. 5B

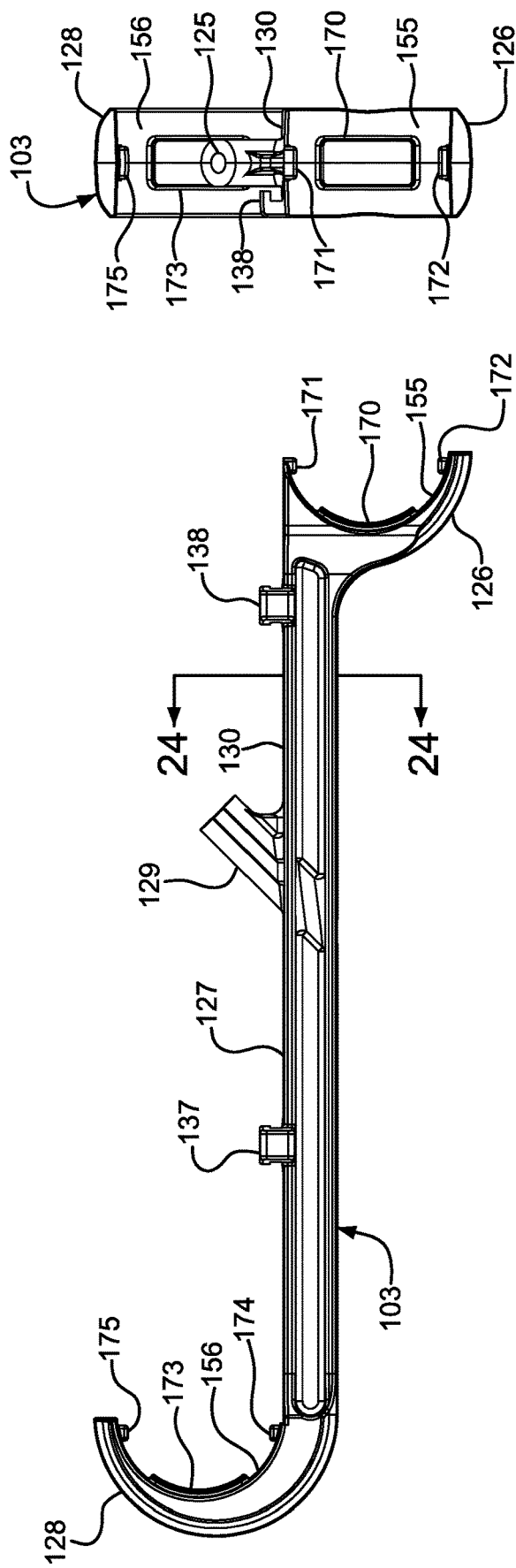

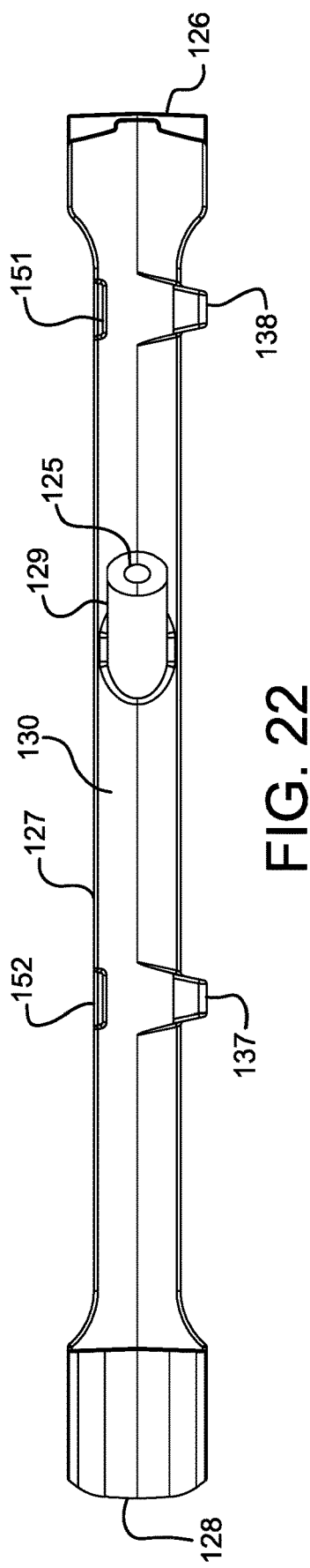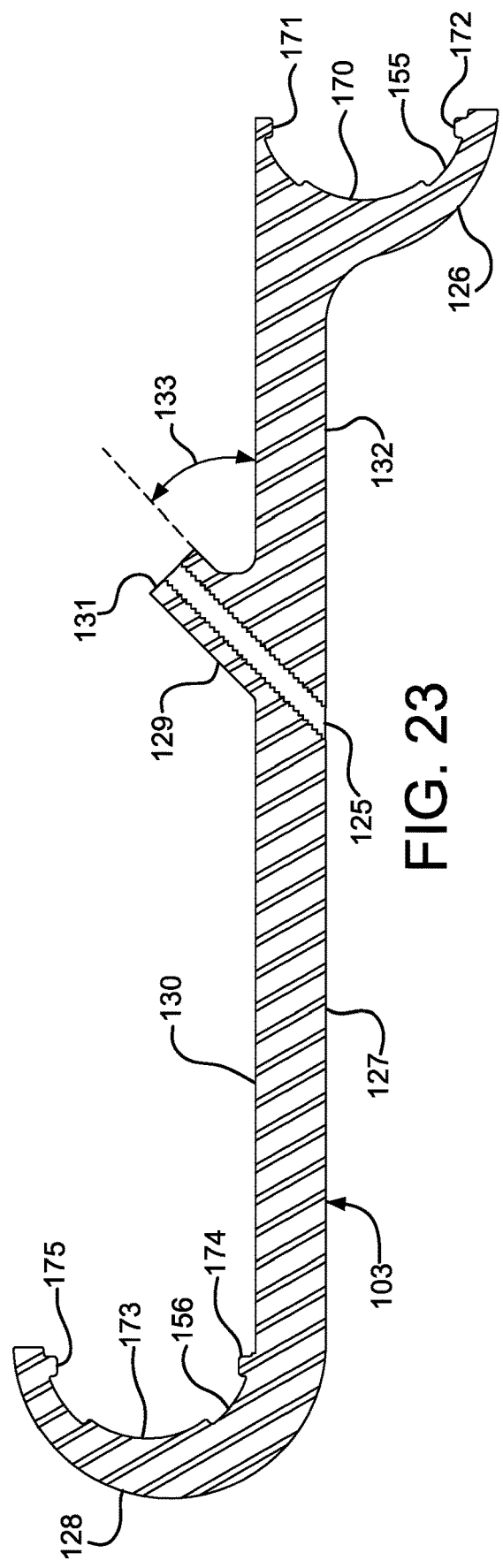

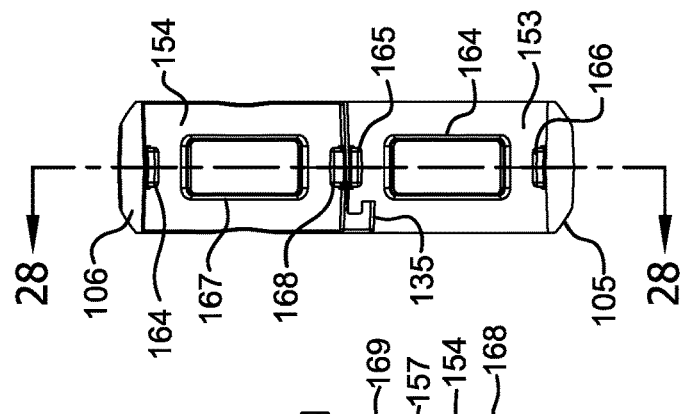
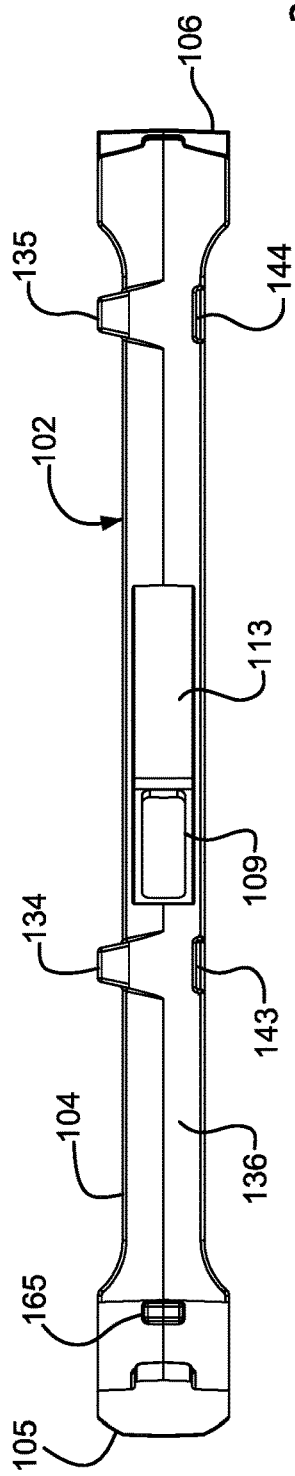
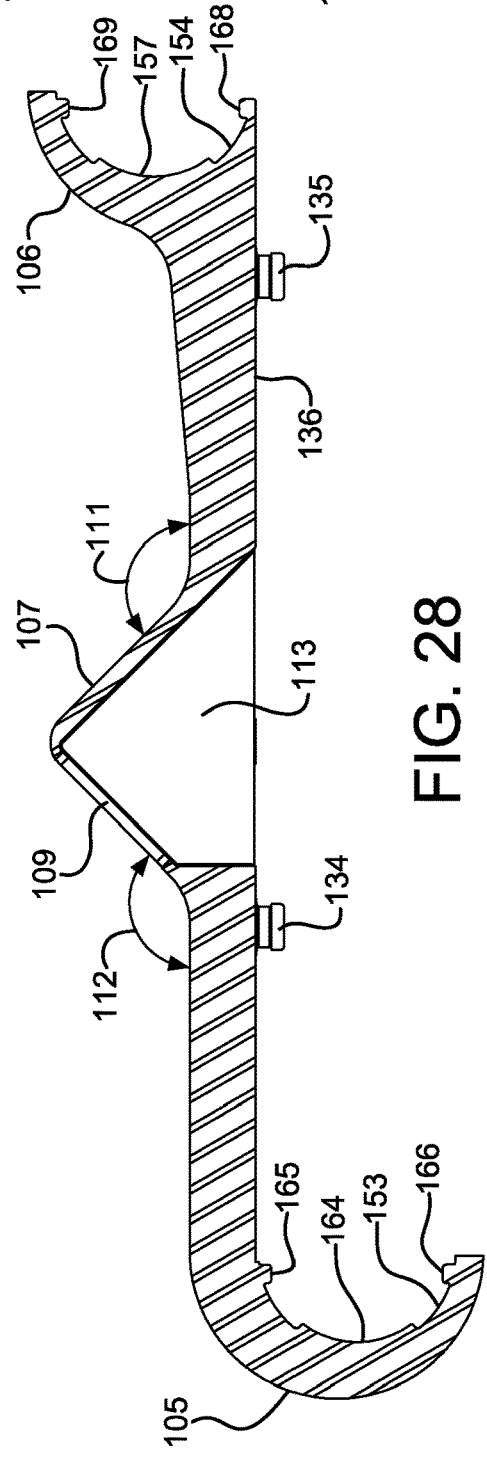

SPACER ASSEMBLY FOR CONDUCTOR BUNDLE

CROSS-REFERENCE TO RELATED APPLICATION

This application is a continuation of U.S. application Ser. No. 13/473,987, filed on May 17, 2012 and now U.S. Pat. No. 9,412,493, which claims the benefit under 35 U.S.C. § 119(e) of U.S. Provisional Application Ser. No. 61/494,501, filed Jun. 8, 2011, the disclosures or which are hereby incorporated by reference in their entirety.

U.S. patent application Ser. No. 13/466,732, filed May 8, 2012 and entitled which claims the benefit under 35 U.S.C. § 119(e) of U.S. Provisional Patent Application Ser. No. 61/493,592, which was filed Jun. 6, 2011, discloses related subject matter and is hereby incorporated by reference in its entirety.

FIELD OF THE INVENTION

The present invention relates generally to a spacer assembly for a conductor bundle that maintains a minimum distance between received conductors. More particularly, the present invention relates to first and second clamping bodies of a spacer that prevent movement of the first and second clamping bodies with respect to one another after installation. Still more particularly, the present invention relates to a spacer assembly in which first and second clamping bodies connected by a fastener are movable with respect to one another without removing the fastener.

BACKGROUND OF THE INVENTION

In the electrical utilities industry, conductor bundles can be used to transmit bulk power with reduced loss, thereby increasing transmission efficiency. A conductor bundle is a series of two, three or four conductors spaced apart by non-conducting spacers. Bundled conductors are used on high-voltage power lines to help reduce energy losses (due to the corona effect), audible noise and radio interference. As a result, the conductor bundles improve the power transmission process.

However, one disadvantage associated with conductor bundles is that they have higher wind loading. The spacers must maintain separation between the conductors of the bundle to prevent arcing, particularly during higher winds. Arcing can cause damage to equipment of the power distribution system. Accordingly, a need exists for a spacer assembly that facilitates maintaining separation between conductors.

Spacer assemblies for conductor bundles exist in which two clamping bodies are slid toward one another and then secured together to space apart received conductors. A fastener is used to secure the two clamping bodies together. A disadvantage associated with such spacer assemblies is that the fastener must be removed from at least one of the clamping bodies to allow the clamping bodies to slide with respect to one another when opening or closing the spacer assembly. An operator in the field cannot secure the clamping bodies together if the fastener is dropped or lost. Accordingly, a need exists for a spacer assembly for conductor members in which a fastener is not removed from either clamping body to open or close the spacer assembly.

Accordingly, a need exists to provide a spacer assembly for a conductor bundle that is easy to install and maintains spacing between conductors of a conductor bundle.

SUMMARY OF THE INVENTION

An object of the present invention is to provide a spacer assembly for a conductor bundle that maintains a predetermined spacing between conductors.

Another object of the present invention is to provide a spacer assembly that is quick and easy to install.

Another object of the present invention is to provide a spacer assembly that prevents movement of first and second clamping bodies with respect to one another after installation.

Still another object of the present invention is to provide a spacer assembly in which clamping bodies connected by a fastener are movable relative to one another without removing the fastener.

The foregoing objects are basically attained by a spacer assembly including first and second clamping bodies. The first clamping body has a first slot therein and the second clamping body has an opening. A fastener is received by the first clamping body slot and the second clamping body opening to secure the first clamping body to the second clamping body such that rotation of the fastener moves the fastener in the first clamping body slot to move the first clamping body relative to the second clamping body.

The foregoing objects are also basically attained by a spacer assembly including first and second clamping bodies. The first clamping body has a first threaded slot therein, a first outwardly extending tab and a first longitudinally extending shoulder. The isosceles trapezoid prism-shaped protrusion extends upwardly from the first clamping body. The first slot is formed in the isosceles trapezoid prism-shaped protrusion. The second clamping body has a threaded opening, a second outwardly extending tab and a second longitudinally extending shoulder. A fastener is received by the first slot and the opening to secure the first clamping body to the second clamping body such that rotation of the fastener moves the fastener in the first clamping body slot, thereby moving the first clamping body relative to the second clamping body. The second shoulder movably receives the first tab and the first shoulder movably receives the second tab to further secure the first clamping body to the second clamping body.

The foregoing objects are also basically attained by a method of spacing conductors in which a first clamping body is connected to a second clamping with a fastener. The fastener is rotated in a first direction to rotate one of the clamping bodies towards the other clamping body to securely receive a conductor therebetween.

Objects, advantages, and salient features of the invention will become apparent from the following detailed description, which, taken in conjunction with the annexed drawings, discloses an exemplary embodiment of the present invention.

As used in this application, the terms "front," "rear," "upper," "lower," "upwardly," "downwardly," and other orientational descriptors are intended to facilitate the description of the exemplary embodiments of the present invention, and are not intended to limit the structure thereof to any particular position or orientation.

BRIEF DESCRIPTION OF THE DRAWINGS

The above benefits and other advantages of the various embodiments of the present invention will be more apparent from the following detailed description of exemplary embodiments of the present invention and from the accompanying drawing figures, in which:

FIG. 2 is a side elevational view of the spacer assembly of FIG. 1;

FIG. 2A is a partial front elevational view of an alternative rib in cross section of one clamping body;

FIG. 2B is a partial front elevational view in cross section of a rib of one clamping body of FIG. 1;

FIGS. 2C and 2D are partial side elevational views of protruding pins of the upper clamping body;

FIG. 5 is a side elevational view in cross section of the spacer assembly of FIG. 3;

FIG. 5A is a side elevational view in cross section of the spacer assembly of FIG. 3 in the open position;

FIG. 5B is a top plan view in partial cross section of a clamping body of the spacer assembly of FIG. 3;

FIG. 6 is a bottom plan view of the spacer assembly of FIG. 3;

FIG. 20 is a side elevational view of a second clamping body of the spacer assembly of FIG. 16;

FIG. 21 is a front elevational view of the second clamping body of FIG. 20;

FIG. 22 is a top plan view of the second clamping body of FIG. 20;

FIG. 23 is a side elevational view in cross section of the second clamping body of FIG. 20;

FIG. 26 is a front elevational view of the first clamping body of FIG. 25;

FIG. 27 is a bottom plan view of the first clamping body of FIG. 25;

FIG. 28 is a side elevational view in cross section of the first clamping body of FIG. 25;

Throughout the drawings, like reference numerals will be understood to refer to like parts, components and structures.

DETAILED DESCRIPTION OF EXEMPLARY EMBODIMENTS

Figure 1:
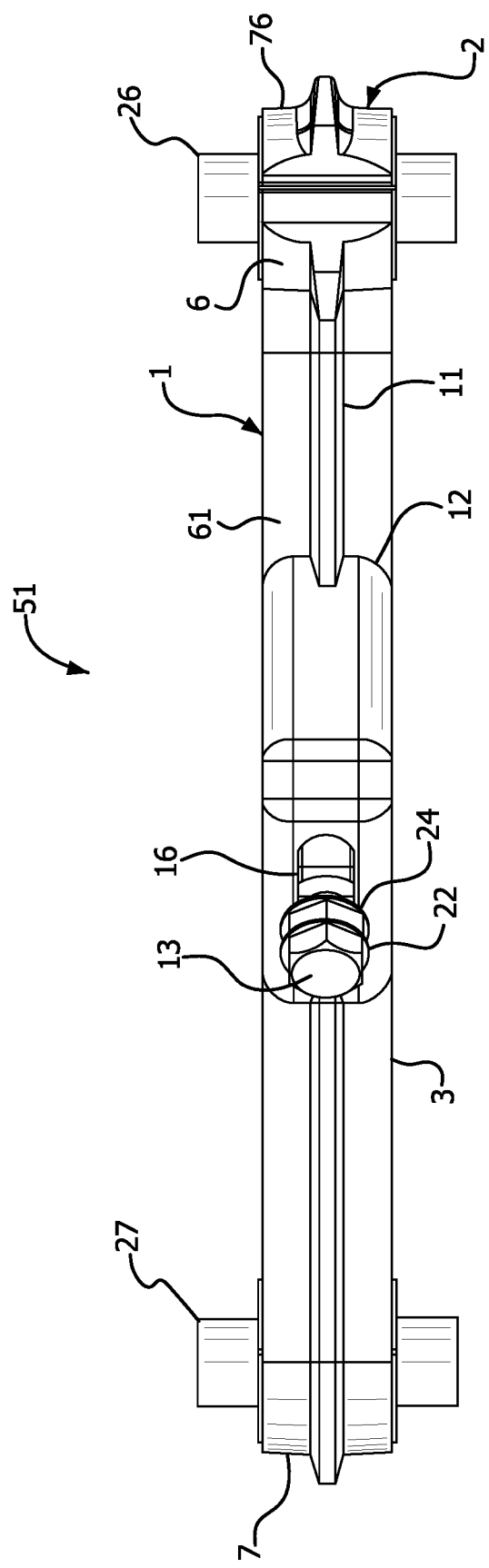
FIG. 1 is a top plan view of a spacer assembly in accordance with a first exemplary embodiment of the present invention receiving two conductors.

In a first exemplary embodiment of the present invention shown in FIGS. 1-15, a spacer assembly 51 is adapted to receive first and second conductors 26 and 27 and maintain a fixed spacing therebetween. As shown in FIGS. 1 and 2, the conductors 26 and 27 are not insulated. Accordingly, maintaining a fixed spacing between the high voltage conductors 26 and 27 substantially prevents arcing and other dangerous and adverse electrical occurrences that can happen when the uninsulated high voltage conductors move too close together. The spacer assembly 51 in accordance with the first exemplary embodiment of the present invention maintains a fixed distance between the uninsulated high voltage conductors 26 and 27 to substantially prevent arcing and other dangerous electrical occurrences from happening.

Figure 3:
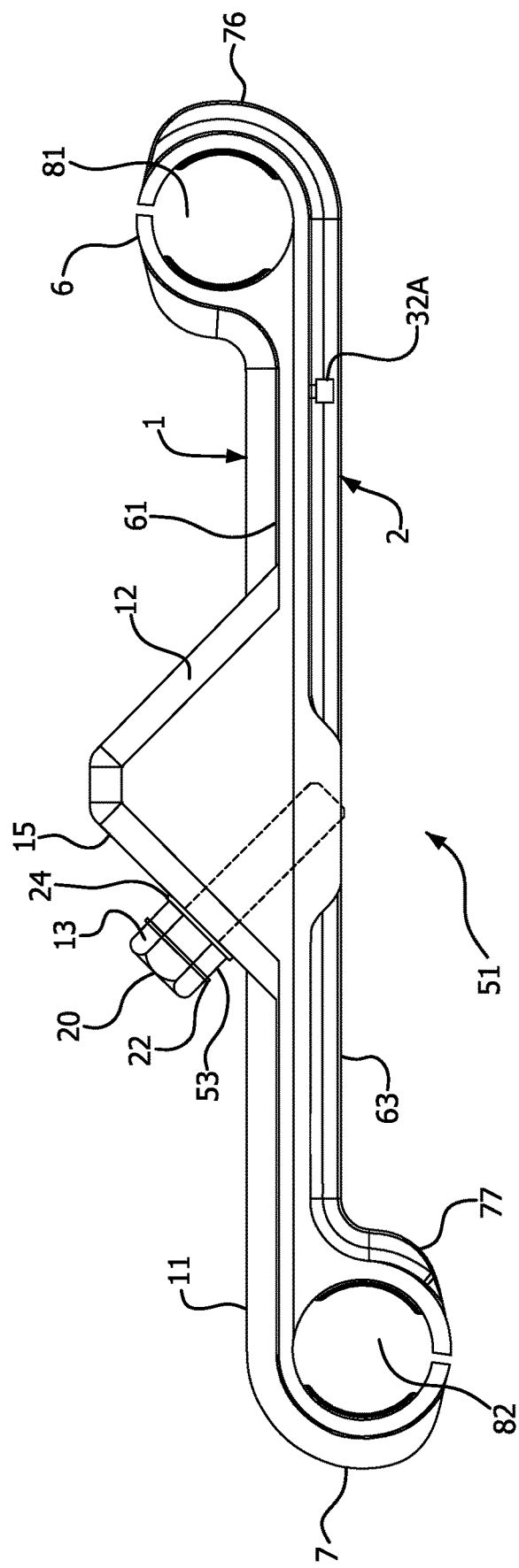
FIG. 3 is a side elevational view of the spacer assembly of FIG. 1 without the conductors.
Figure 4:
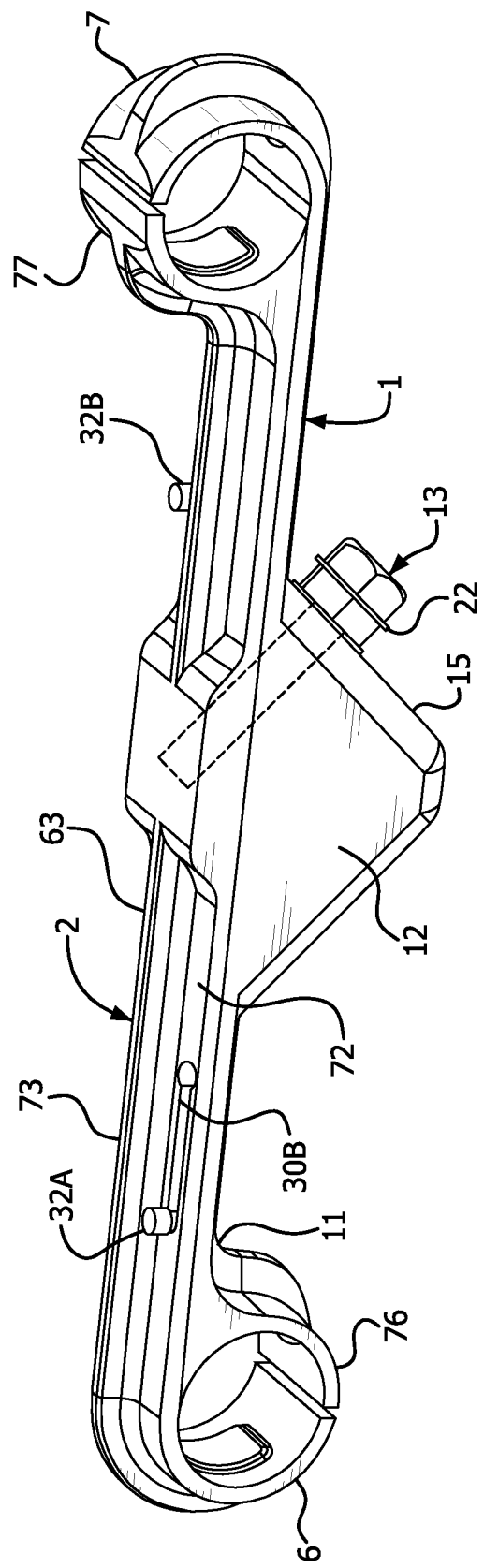
FIG. 4 is a perspective view from the bottom of the spacer assembly of FIG. 1 without the conductors.

The spacer assembly 51 has a first clamping body, or an upper body casting, 1 and a second clamping body, or lower body casting, 2, as shown in FIGS. 1, 2, 3 and 15. The first clamping body 1 has a first conductor receiving portion 6 at a first end of a connecting arm 3 and a second conductor receiving portion 7 at a second end thereof. The configuration of the first and second clamping bodies 1 and 2 can have various numbers and sizes of protruding ribs 11, as shown in cross section in FIGS. 2A and 2B. As shown in FIGS. 1 and 2B, a single rib 11 extends along a longitudinal axis on an upper surface 61 of the connecting arm 3. Alternatively, a pair of ribs 11 extends along outer edges of the connecting arm 3, as shown in FIG. 2A. A rib 63 is similarly disposed on the second clamping body 2, as shown in FIGS. 2 and 4, and extends outwardly from an upper surface 72 of a connecting arm 73 of the second clamping body 2.

Figure 7:
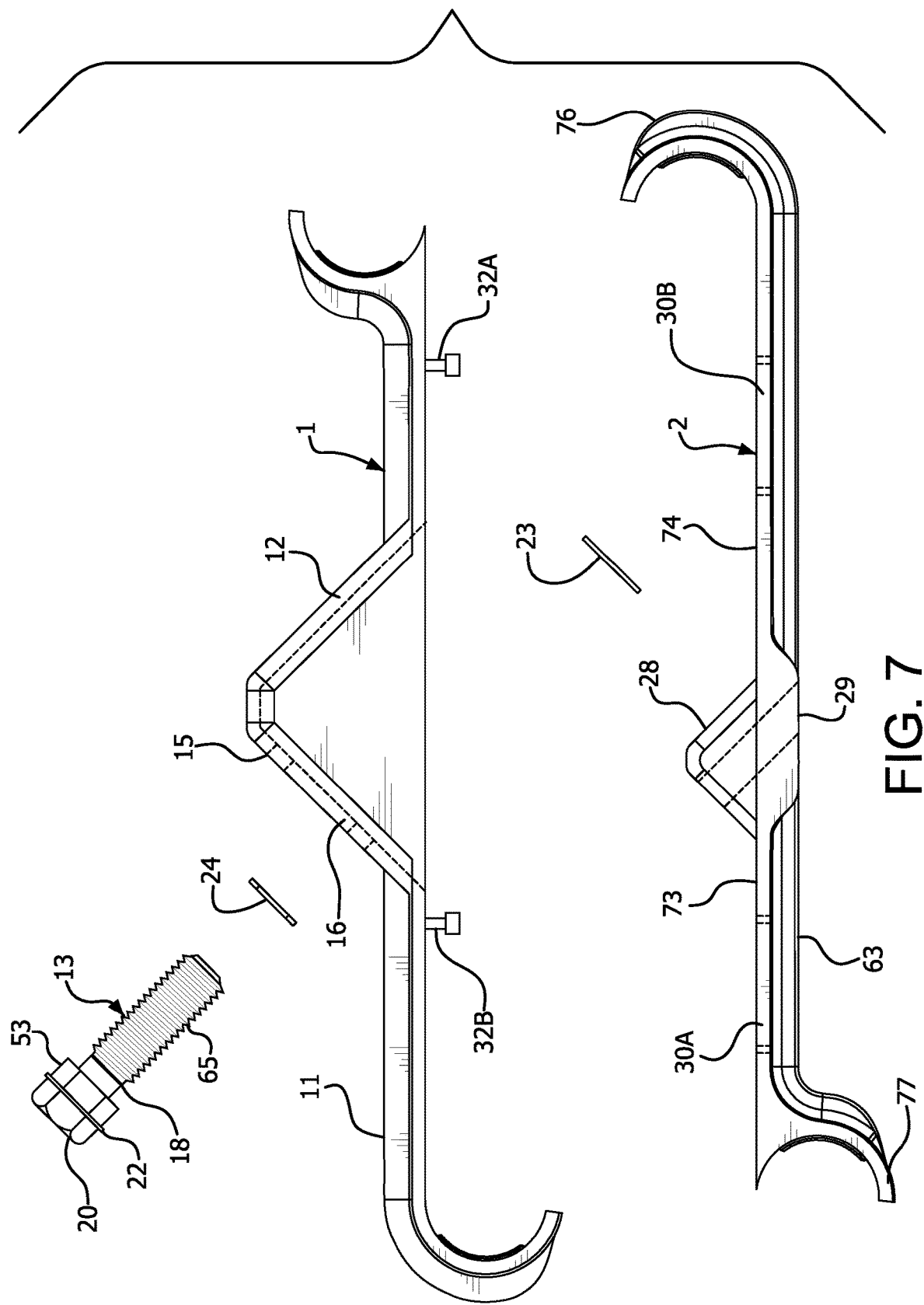
FIG. 7 is an exploded side elevational view of the spacer assembly of FIG. 3.
Figure 14:
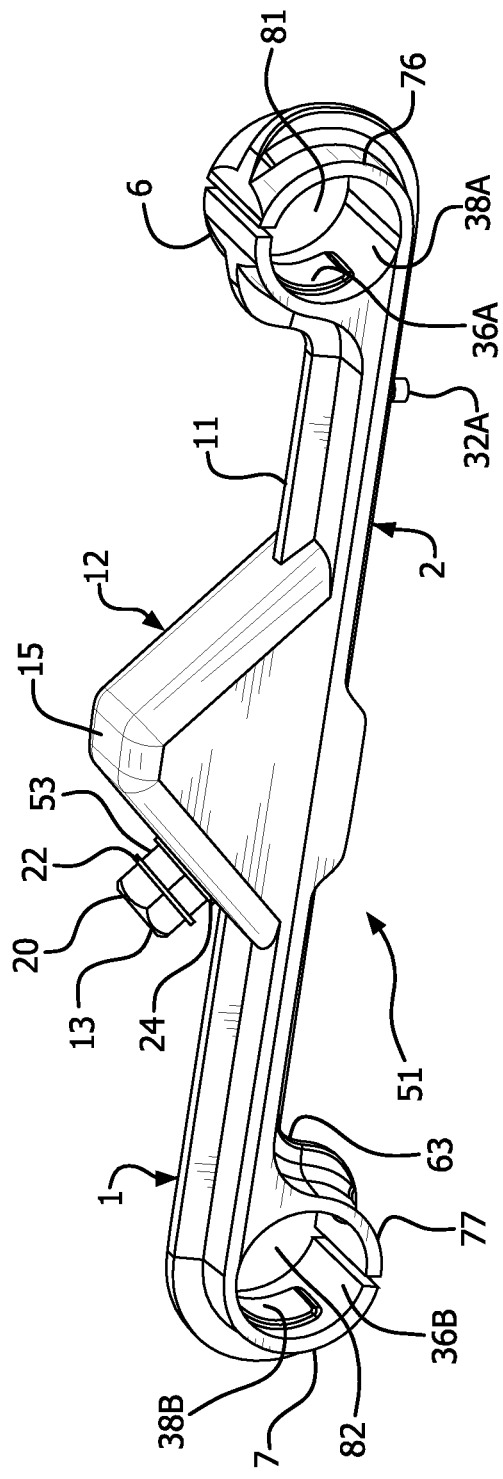
FIG. 14 is a perspective view of an assembled spacer assembly of FIG. 1 without the conductors in a closed position.
Figure 15:
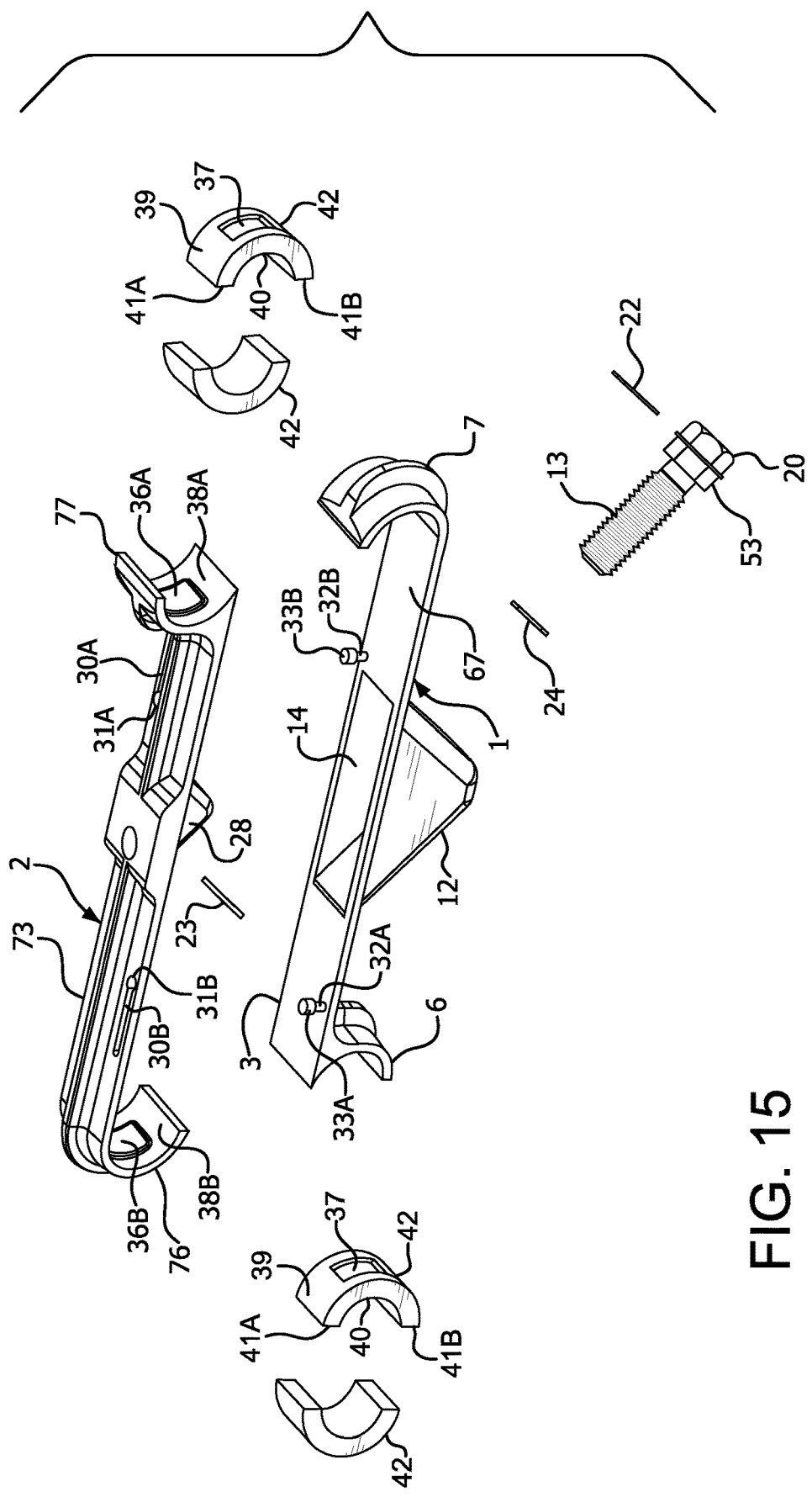
FIG. 15 is an exploded perspective view from the bottom of the spacer of FIG. 1 without the conductors.

The first clamping body 1 has a tapered protrusion 12 extending outwardly from and approximately centered on the upper surface 61 of the connecting arm 3, as shown in FIGS. 2, 3, 5 and 7. The protrusion 12 receives a fastener, such as a bolt, 13, as shown in FIGS. 2, 3, 4, 5, 7, 14 and 15. Preferably, the protrusion is an isosceles trapezoid prism. The protrusion 12 is preferably an isosceles trapezoid in side view with included base angles of approximately 45 degrees. Accordingly, the preferred angles 34A and 34B between the side of the protrusion 12 and the upper surface 61 of the connecting arm 3, as shown in FIG. 5, is preferably approximately 135 degrees. The protrusion 12 has a correspondingly shaped cavity 14, as shown in FIGS. 5, 5A and 15. An outer surface 15 of the protrusion 12 has an elongated slot 16 through which the fastener 13 travels, as shown in FIG. 5B. The elongated slot 16 is disposed on one side of the protrusion 12, as shown in FIGS. 5A and 7.

Figure 9:
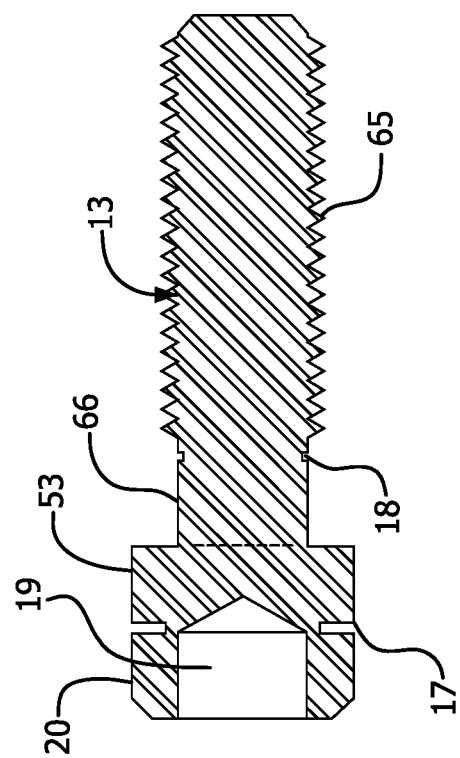
FIG. 9 is a side elevational view in cross section of the fastener of FIG. 8.
Figure 8:
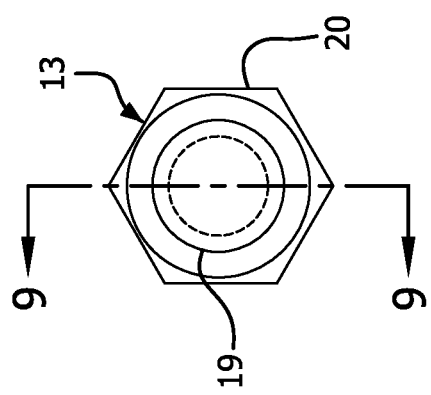
FIG. 8 is a top plan view of a fastener of the spacer assembly of FIG. 1.
Figure 12:
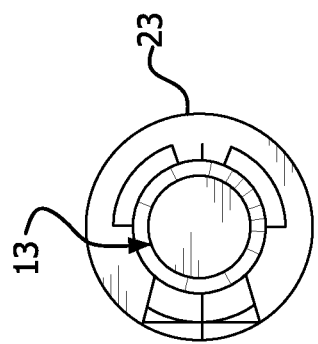
FIG. 12 is a rear elevational view of the fastener of FIG. 11 with first and second retainers disposed thereon.
Figure 11:
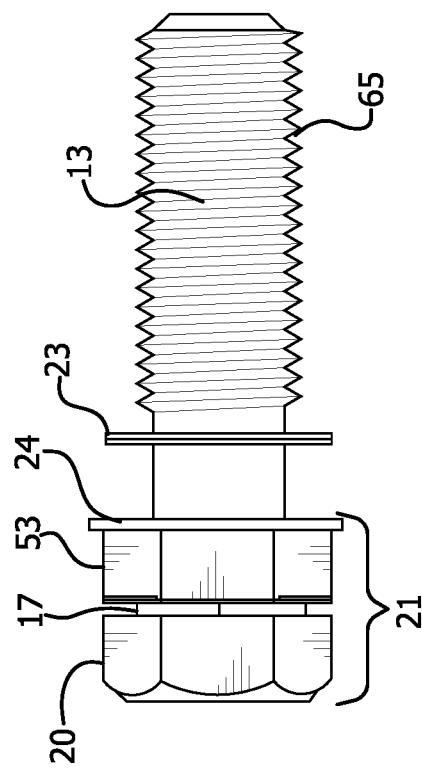
FIG. 11 is a side elevational view of the fastener of FIG. 8 with first and second retainers disposed thereon.
Figure 13:
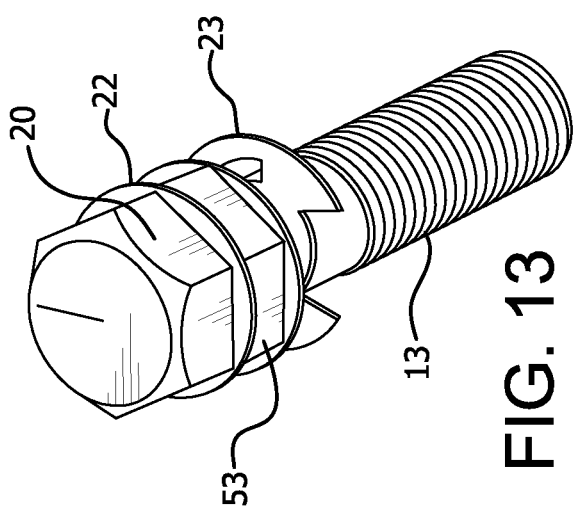
FIG. 13 is a perspective view of the bolt of FIG. 11 with first and second retainers disposed thereon.
Figure 10:
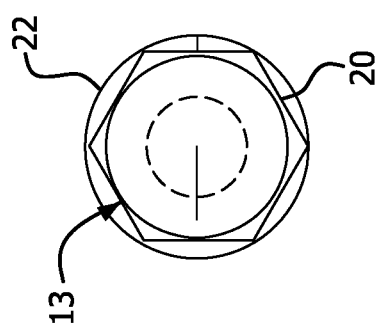
FIG. 10 is a top plan view of the fastener of FIG. 8 with a retainer disposed thereon.

The fastener 13 has a first retaining groove 17 in the hex head portion of the bolt, as shown in FIGS. 9 and 11. The fastener 13 can also have a second retaining groove 18 in the unthreaded portion of the shank, as shown in FIG. 9. The fastener 13 has a counter bore hole 19 in the hex head that facilitates, in addition to the retaining groove 17, the breaking off of the top portion 20 of the fastener 13, as shown in FIGS. 9, 11 and 13. The two-stage head 21 of the fastener 13 allows the top portion 20 to break away from the lower portion 53 during installation.

A first retainer 22 is disposed in the retaining groove 17 to prevent the tool, such as a wrench or socket, from making contact with the second stage (lower portion) 53 of the two stage head 21. Alternatively, the first retainer 22 can be any suitable member, such as an O-ring. The top portion 20 breaks off at a pre-determined torque. The pre-determined torque is required to apply the correct amount of pressure to the conductors. When the pre-determined torque is obtained, the top portion 20 of the bolt 13 breaks off, thereby preventing too much pressure from being exerted on the conductors 26 and 27. The second stage (lower portion) 53 of the fastener 13 is for opening the spacer assembly 51 when required. The shank retainer 23 disposed in the groove 18 prevents the fastener 13 from separating from the protrusion 12, as shown in FIGS. 5 and 11-13. A flat washer 24 is installed between the two stage head 21 and the outer surface 15 of the protrusion 12, as shown in FIG. 5A. The end of the fastener 13 has a thread 65 corresponding to a fastener opening 29 in the second clamping member 2, as shown in FIGS. 5 and 5A.

The second clamping body 2 has a first conductor receiving portion 76 at a first end of a connecting arm 73 and a second conductor receiving portion 77 at a second end thereof. A tapered protrusion 28 having a threaded fastener opening 29, as shown in FIGS. 5 and 15, extends outwardly from an upper surface 74 of the connecting arm 73. Preferably, the protrusion 28 is an isosceles trapezoid prism. The protrusion 28 is received in the cavity 14 of the protrusion 12 of the first clamping body 1 with sufficient clearance, as shown in FIGS. 5 and 5A.

The second clamping body 2 has two long substantially oval-shaped slots 30A and 30B, as shown in FIG. 15, disposed in the connecting arm 73. At one end of each the slots 30A and 30B, there is a circumferential hole 31A and 31B, as shown in FIG. 15. The first clamping body 1 has two protruding pins 32A and 32B, as shown in FIG. 15, extending outwardly from a lower surface 67 of the connecting arm 3. The pins 32A and 32B have a larger diameter head 33A and 33B than shank of the pin. When the first clamping body 1 is assembled to the second clamping body 2, the protruding pins 32A and 32B of the first clamping body 1 self-align with the oval slots 30A and 30B of the second clamping body 2. The heads 33A and 33B of the protruding pins 32A and 32B pass through the circumferential holes 31A and 31B, respectively. The bodies of the pins 32A and 32B move within the slots 30A and 30B to allow the first and second clamping bodies 1 and 2 to slide longitudinally with respect to one another without separating. The heads 33A and 33B of the protruding pins 32A and 32B are larger than the widths of the slots 30A and 30B to prevent separation of the first and second clamping bodies 1 and 2.

When the spacer assembly 51 is assembled, conductor cavities 81 and 82 are formed by the conductor receiving portions 6 and 76 and 7 and 77 of the first and second clamping bodies 1 and 2. The protrusion 28 of the second clamping body 2 is received in the cavity 14 of the protrusion 12 of the first clamping body 1, as shown in FIG. 5A. The conductor cavities 81 and 82 can be increased or decreased by tightening or loosening the fastener 13. When the fastener 13 is tightened to close the spacer assembly 51, the fastener 13 is positioned at the bottom of the elongated slot 16, as shown in FIGS. 2, 3 and 5. When the fastener 13 is loosened from the closed position of FIG. 5, the fastener 13 travels to the top of the elongated slot 16, as shown in FIG. 5A. The angles 34A and 34B of the protrusion 12 determine the travel of the fastener 13, as shown in FIG. 5. Smaller angles 34A and 34B increase the travel length of the fastener 13 with respect to a larger angle, as shown in FIG. 5. Loosening the fastener 13 unthreads the fastener 13 from the threaded opening 29 in the protrusion 28 in the second clamping body 2. The shank retainer 23 prevents the fastener 13 from being withdrawn from the protrusion 12 of the first clamping body 1, thereby causing the first clamping body 1 to slide longitudinally to accommodate the fastener 13 in the elongated slot 16. The pins 32A and 32B slide in the slots 30A and 30B to further facilitate movement of the first and second clamping bodies 1 and 2 with respect to one another. This process is reversed when tightening the fastener 13.

A grommet 42 has a conductor groove 40, an outer circumferential surface 39, a cavity 37 and contact surfaces 41A and 41B. The conductor receiving portion 6 of the first clamping body 1 has a protruding boss surface 36A and a circumferential cavity 38A, as shown in FIG. 14. The corresponding conductor receiving portion 76 of the second clamping body 2 to form the conductor cavity 81 has corresponding features, as shown in FIG. 15. When the grommet 42 is installed in the first clamping body 1, a cavity 37 formed in the grommet 42 engages the protruding boss surface 36A and the circumferential surface 39 of the grommet 42 contacts the circumferential surface 38A. A corresponding grommet 42 is engaged with the corresponding features of the second clamping body 2 to form a substantially cylindrical grommet in the conductor cavity 81, as shown in FIG. 2. An adhesive can be used to further secure the grommets 42 to the clamping bodies 1 and 2.

The second conductor receiving portion 7 of the first clamping body 1 has a protruding boss surface 36B and a circumferential cavity 38B, as shown in FIG. 14. When the grommets 42 are installed at the other end of the spacer, the cavity 37 of the grommet 42 engages the protruding boss surface 36B and the circumferential surface 39 of the grommet 42 makes contact with the circumferential surface 38B of the second conductor receiving portion 7 of the first clamping body 1. A corresponding grommet 42 is engaged with the corresponding features of the second conductor receiving portion 77 of the second clamping body 2 to form a substantially cylindrical grommet in the conductor cavity 82, as shown in FIGS. 2 and 15. An adhesive can be used to further secure the grommets 42 to the first and second clamping bodies 1 and 2.

In a second exemplary embodiment shown in FIGS. 16-31, a spacer assembly 101 is adapted to receive first and second conductors and maintain a fixed spacing therebetween. As shown in FIGS. 1 and 2, the conductors 26 and 27 are not insulated. Accordingly, maintaining a fixed spacing between the high voltage conductors 26 and 27 substantially prevents arcing and other dangerous electrical occurrences that can happen when the uninsulated high voltage conductors move too close together. The spacer assembly 101 in accordance with the second exemplary embodiment of the present invention maintains a fixed distance between the uninsulated high voltage conductors 26 and 27 to substantially prevent arcing and other dangerous electrical occurrences from happening.

Figure 16:
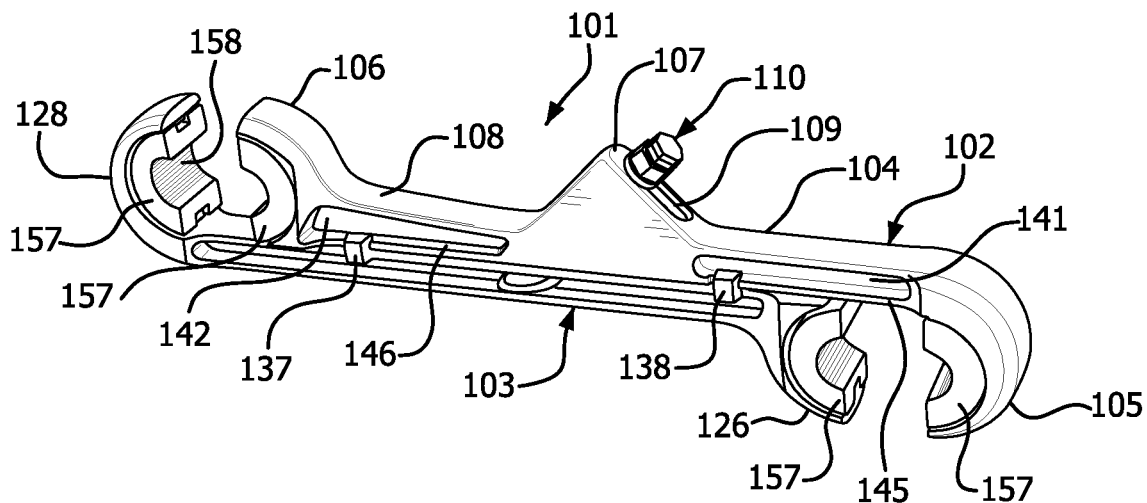
FIG. 16 is a perspective view of a spacer assembly in accordance with a second exemplary embodiment of the present invention in which the clamping bodies are spaced apart in an open position.
Figure 17:
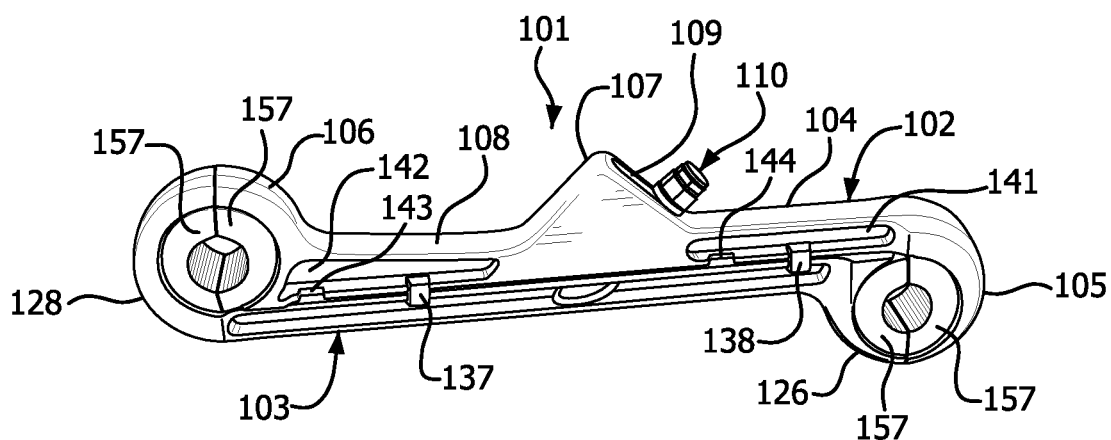
FIG. 17 is a perspective view of a spacer assembly of FIG. 16 in which the clamping bodies are in a closed position.
Figure 18:
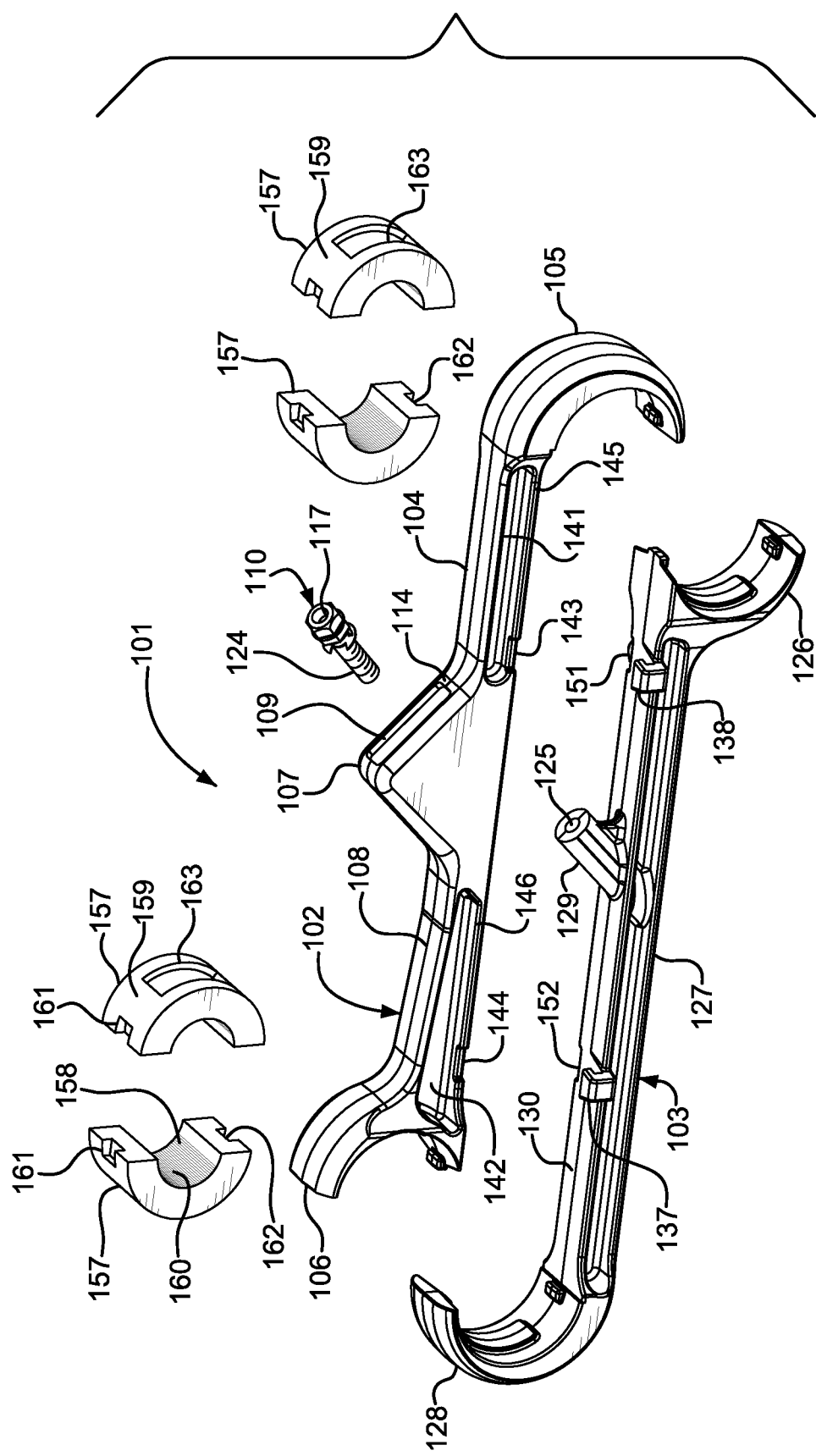
FIG. 18 is an exploded perspective view of the spacer assembly of FIG. 16.
Figure 25:
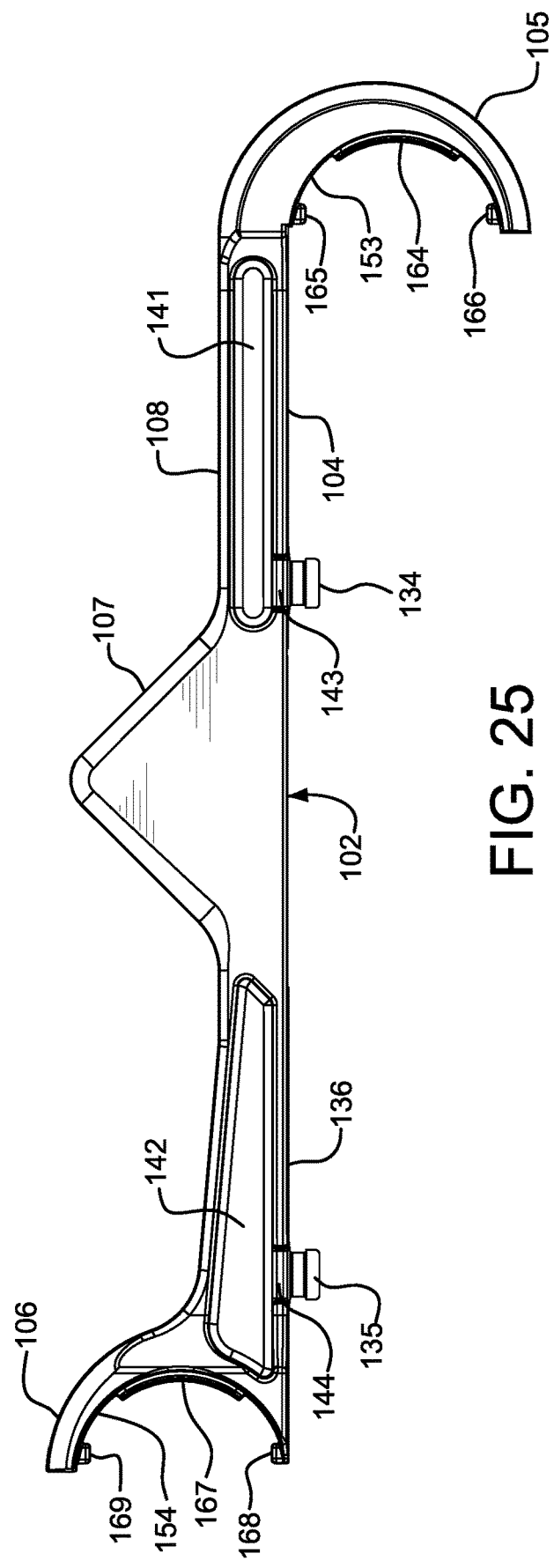
FIG. 25 is a side elevational view of a first clamping body of the spacer assembly of FIG. 16.
Figure 29:
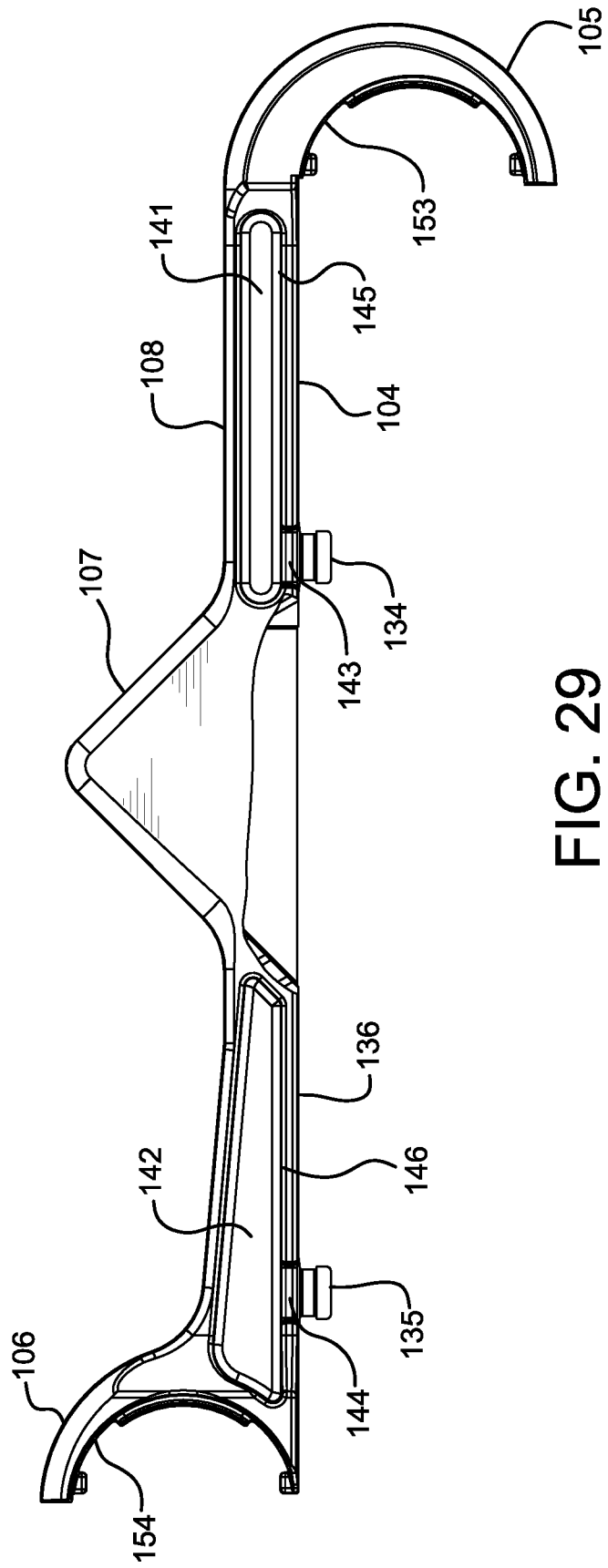
FIG. 29 is a front elevational view in cross section of the first clamping body of FIG. 25.

The spacer assembly 101 has a first clamping body, or an upper body casting, 102 and a second clamping body, or lower body casting, 103, as shown in FIGS. 16-19. The first clamping body 102 has a first conductor receiving portion 105 disposed at an end of a connecting arm 104. The other end of the connecting arm 104 has a second conductor receiving portion 106. The conductor receiving portions 105 and 106 are preferably substantially C-shaped and extend in opposite directions from the connecting arm 104, as shown in FIGS. 18, 28 and 29. As shown in FIG. 25, the first conductor receiving portion 105 extends downwardly from the connecting arm 104 and the second conductor receiving portion 106 extends upwardly therefrom. Inner surfaces 153 and 154 of the conductor receiving portions 105 and 106 preferably face the same direction, e.g., to the right as shown in FIGS. 28 and 29.

Figure 19:
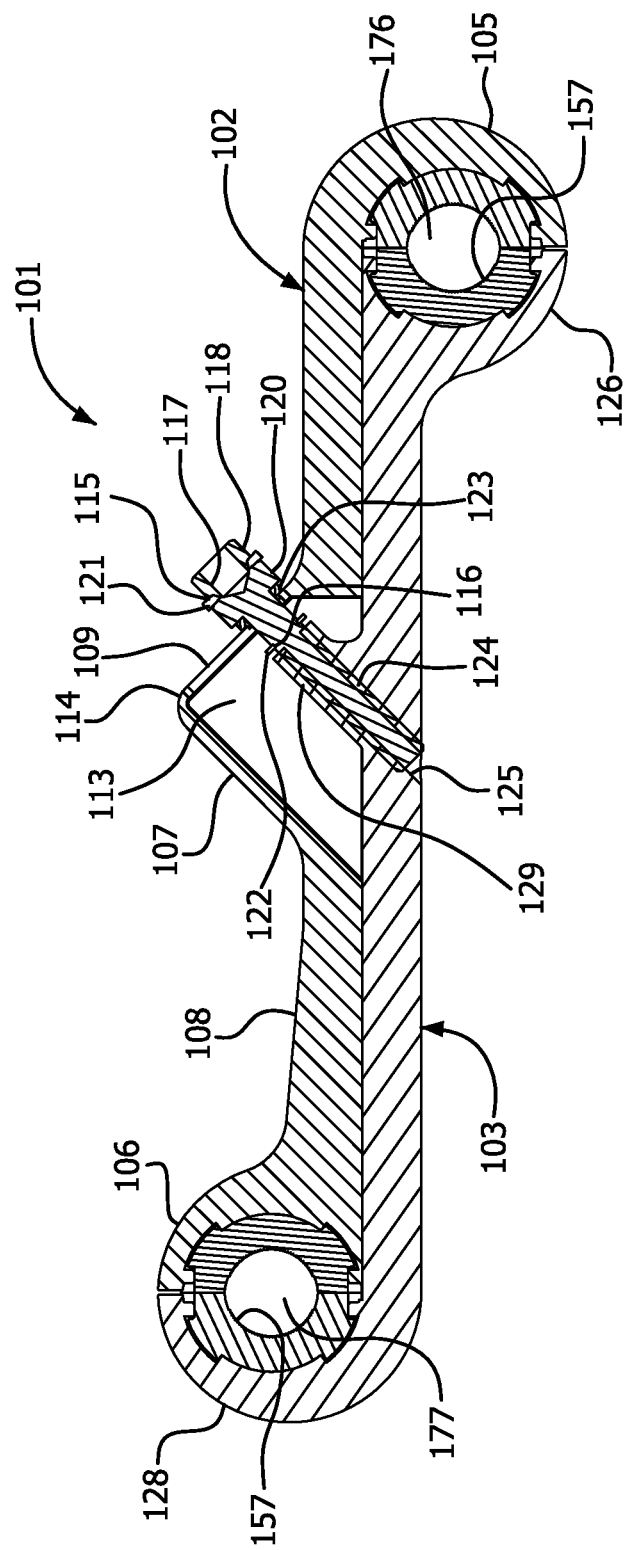
FIG. 19 is an elevational view in cross section of the spacer assembly of FIG. 17.

A tapered protrusion 107 extends upwardly from an upper surface 108 approximately mid-way along a length of the connecting arm 104, as shown in FIG. 16-19. Preferably, the protrusion 107 is an isosceles trapezoid prism. The protrusion 107 has an elongated slot 109 for receiving a fastener 110, as shown in FIG. 16-19. Preferably, the protrusion 107 is an isosceles triangle with base angles of approximately 45 degrees. Accordingly, the preferred angles 111 and 112 between the sides of the protrusion 107 and the upper surface 108 of the first clamping body 102, as shown in FIG. 28, is preferably approximately 135 degrees. The protrusion 107 has a correspondingly shaped cavity 113, as shown in FIGS. 19 and 28. The elongated slot 109 is disposed in an outer surface 114 of the protrusion 107 to access the cavity 113 and through which the fastener 110 rides, as shown in FIG. 19.

The fastener 110 is substantially identical to the fastener 13 described with respect to the first exemplary embodiment. A first retaining groove 115 in the hex head portion of the fastener, as shown in FIG. 19. The fastener 110 can also have a second retaining groove 116 in the unthreaded portion of the shank, as shown in FIG. 19. The fastener 110 preferably has a counter bore hole 117 in the hex head that facilitates, in addition to the retaining groove 115, the breaking off of the top portion 118 of the fastener 110, as shown in FIG. 19. The two-stage head 119 of the fastener 110 allows the top portion 118 to break away from the lower portion 120 during installation.

A first retainer 121 is disposed in the first retaining groove 115 to prevent the tool, such as a wrench or socket, from making contact with the second stage 120 of the two stage head 119. The top portion 118 is the one that is designed to break off at a pre-determined torque. The pre-determined torque is required to apply the correct amount of pressure to the conductors. When the pre-determined torque is obtained, the top portion 118 of the fastener 110 breaks off, thereby preventing too much pressure from being exerted on the conductors 26 and 27 (FIGS. 1 and 2). The second stage 120 of the fastener 110 is for removing the spacer assembly 101 when required. The shank retainer 122 disposed in the second retaining groove 116 prevents the fastener 110 from separating from the cavity 113, as shown in FIG. 19. A flat washer 123 is installed between the two stage head 119 and the upper surface 114 of the isosceles trapezoid prism-shaped protrusion 107. The end of the fastener 110 has a thread 124 corresponding to a fastener opening 125 in the second clamping body 103, as shown in FIGS. 18 and 19.

A second clamping body 103 has a first conductor receiving portion 126 disposed at an end of a connecting arm 127. The other end of the connecting arm 127 has a second conductor receiving portion 128. The second clamping body 103 has a mounting post 129 extending outwardly from an upper surface 130 of the connecting arm 127, as shown in FIGS. 18 and 23. The threaded fastener opening 125 extends from a free end 131 of the mounting post 129 to a lower surface 132 of the connecting arm 127, as shown in FIG. 23. Preferably, an angle 133 of approximately 45 degrees is formed between the mounting post 129 and the upper surface 130 of the connecting arm 127 of the second clamping body 103. The mounting post 129 is receiving within the cavity 129 of the protrusion 107 when the second clamping body 103 is connected to the first clamping body 102, as shown in FIG. 19.

The conductor receiving portions 126 and 128 of the second clamping body 103 are preferably substantially C-shaped and extend in opposite directions from the connecting arm 127, as shown in FIGS. 20 and 23. As shown in FIG. 20, the first conductor receiving portion 126 extends downwardly from the connecting arm 127 and the second conductor receiving portion 128 extends upwardly therefrom. Inner surfaces 155 and 156 of the conductor receiving portions 126 and 128 preferably face the same direction, e.g., to the right as shown in FIGS. 20 and 23.

Figure 24:
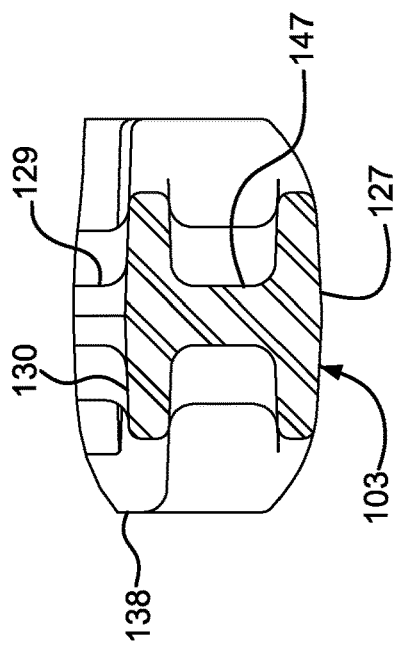
FIG. 24 is a front plan view in cross section of the second clamping body of FIG. 20.
Figure 30:
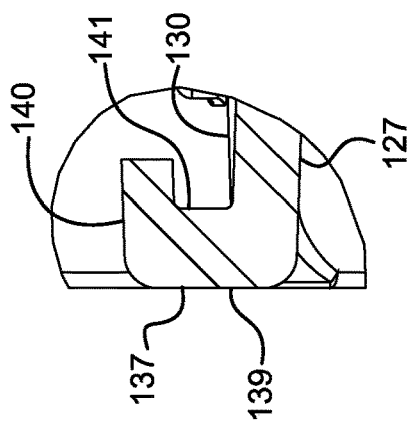
FIG. 30 is a partial side elevational view in cross section of a tab of a clamping body.

The first clamping body 102 has a pair of tabs 134 and 135 extending downwardly from a lower surface 136 of the connecting arm 104, as shown in FIG. 29. The second clamping body 103 has a pair of tabs 137 and 138 extending upwardly from the upper surface 130 of the connecting arm 127, as shown in FIG. 24. Preferably, each of the tabs 134, 135, 137 and 138 is substantially identical. As an example, tab 137, as shown in FIG. 30, is preferably substantially C-shaped. A first leg 139 extends upwardly from the upper surface 130 of the connecting arm 127 of the second clamping body 103. A second leg 140 extends inwardly and substantially perpendicularly from the first leg 139 to form a groove 141 between the second leg 140 and the upper surface 130 of the connecting arm 127 of the second clamping body 103.

A pair of recesses 141 and 142 are formed in the connecting arm 104, as shown in FIGS. 16-18. The recesses 141 and 142 are preferably formed on an opposite side of the connecting arm 104 from the tabs 134 and 135, as shown in FIGS. 27 and 29. Shoulders 145 and 146 are formed in each recess 141 and 142. Slots or cut-outs 143 and 144 are formed in each shoulder 145 and 146, as shown in FIGS. 18 and 27, to allow the tabs 137 and 138 of the second clamping member 103 to pass through the cut-outs 145 and 146 and slide along the shoulders 145 and 146.

Figure 31:
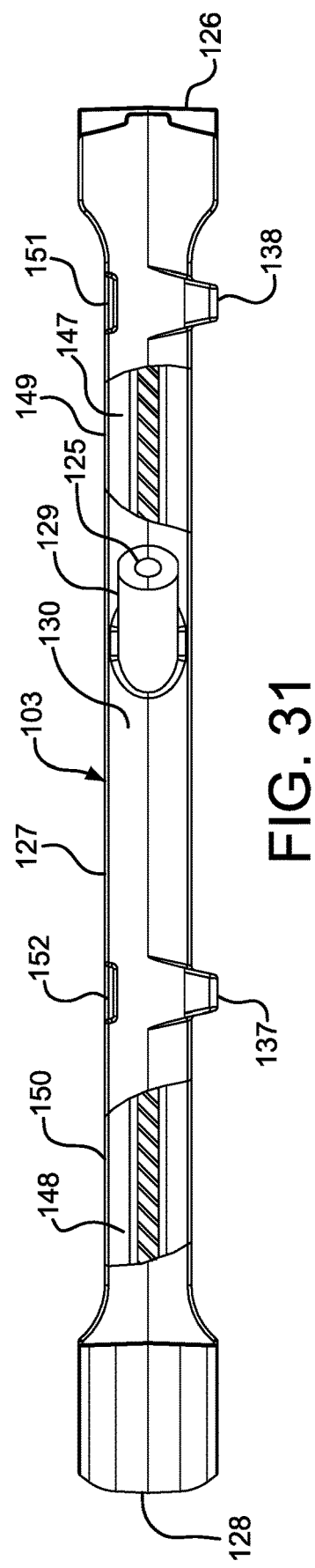
FIG. 31 is a top plan view of a recess of a clamping body.

A pair of recesses 147 and 148 are formed in the connecting arm 127 of the second clamping body 103, as shown in FIGS. 22 and 31. The recesses 147 and 148 are preferably formed on an opposite side of the connecting arm 127 from the tabs 137 and 138. Shoulders 149 and 150 are formed in each recess 147 and 148. Cut-outs 151 and 152 are formed in each shoulder 149 and 150 to allow the tabs 134 and 135 of the first clamping body 102 to pass through the cut-outs 151 and 152 and slide along the shoulders 149 and 150.

The inner surface 153 of the first conductor receiving portion 105 of the first clamping body 102 has a boss 164 extending outwardly therefrom, as shown in FIGS. 25 and 28. The boss 164 is preferably substantially centered on the inner surface 153 of the first conductor receiving portion 105, as shown in FIG. 26. First and second tabs 165 and 166 extend outwardly from the inner surface 153, as shown in FIGS. 25, 26 and 28. The inner surface 154 of the second conductor receiving portion 106 of the first clamping body 102 has a boss 167 extending outwardly therefrom, as shown in FIGS. 25 and 28. The boss 167 is preferably substantially centered on the inner surface 154 of the second conductor receiving portion 106, as shown in FIG. 26. First and second tabs 168 and 169 extend outwardly from the inner surface 154, as shown in FIGS. 25, 26 and 28. The bosses 164 and 167 and tabs 165, 166, 168 and 169 facilitate receiving grommets 157.

The inner surface 155 of the first conductor receiving portion 126 of the second clamping body 103 has a boss 170 extending outwardly therefrom, as shown in FIGS. 20 and 21. The boss 170 is preferably substantially centered on the inner surface 155 of the first conductor receiving portion 126, as shown in FIG. 21. First and second tabs 171 and 172 extend outwardly from the inner surface 153, as shown in FIGS. 20 and 21. The inner surface 156 of the second conductor receiving portion 128 of the second clamping body 103 has a boss 173 extending outwardly therefrom, as shown in FIGS. 20 and 21. The boss 173 is preferably substantially centered on the inner surface 156 of the second conductor receiving portion 128, as shown in FIG. 21. First and second tabs 174 and 175 extend outwardly from the inner surface 156, as shown in FIGS. 20, 21 and 23. The bosses 170 and 173 and tabs 171, 172, 174 and 175 facilitate receiving grommets 157.

A grommet 157 has an inner surface 158 and an outer surface 159, as shown in FIG. 18. Preferably, the inner surface 158 has a plurality of ribs 160 to facilitate receiving a conductor. The grommet has an upper recess 161 and a lower recess 162 for receiving tabs disposed on the inner surfaces of the conductor receiving portions of the first and second clamping bodies 102 and 103. A central recess 163 in the outer surface 159 receives a boss on an inner surface of the conductor receiving portions. Preferably, the grommet 157 is substantially C-shaped such that connecting two grommets 157 together, as shown in FIGS. 18 and 19, forms a cylindrical member having an opening 176 and 177, as shown in FIGS. 17 and 19 therethrough to receive a conductor.

To assemble the spacer assembly 101, a grommet 157 is disposed in each conductor receiving portion 105, 106, 126 and 128, as shown in FIG. 16. The central recess 163 in the outer surface 159 of each grommet 157 is received by the bosses 164, 167, 170 and 173 of each conductor receiving portion, as shown in FIGS. 16 and 19. The upper and lower recesses 161 and 162 of each grommet 157 receive the upper and lower tabs of each conductor receiving portion to further facilitate securing the grommets to the clamping bodies 102 and 103, as shown in FIGS. 16 and 19. An adhesive can be used to further secure the grommets 157 to the first and second clamping bodies 102 and 103.

The clamping bodies 102 and 103 are brought together such that the tabs 137 and 138 of the second clamping body pass through the slots 143 and 144 in the first clamping body 102 and the tabs 134 and 135 of the first clamping body 102 pass through the slots 151 and 152 of the second clamping body 103. The shoulders of the first and second clamping bodies are received in the grooves 141 of the tabs 134, 135, 137 and 138, such that the first and second clamping bodies 102 and 103 can slide with respect to one another. The mounting post 129 of the second clamping body 103 is received in the cavity 113 of the protrusion 107 of the first clamping body 102. The fastener 110 is passed through the elongated slot 109 in the protrusion 107 of the first clamping body 102 such that the threads thereof are received by the opening 125 in the mounting post 129. The second retainer 122 is disposed on the shaft of the fastener 110 after the fastener is passed through the elongated slot 109. The washer 122 prevents the fastener 110 from being withdrawn through the elongated slot 109.

When the spacer assembly 101 is assembled, the corresponding conductor receiving portions 105 and 126, and 106 and 128 can be moved toward or away from one another by tightening or loosening the fastener 110. When the fastener 110 is tightened to close the spacer assembly 101, the fastener 110 is positioned at the top of the elongated slot 109, as shown in FIGS. 17 and 19. When the fastener 110 is loosened from the closed position of FIGS. 17 and 19, the fastener 110 travels to the bottom of the elongated slot 109, as shown in FIG. 18. The angles 111 and 112 of the protrusion 107 determine the travel of the fastener 110, as shown in FIG. 28. A smaller angle 111 and 112 increases the travel length of the fastener 110 with respect to a larger angle.

When the spacer assembly 101 is moved to the closed position from the open position, the fastener 110 is tightened. The fastener 110 is threaded further into the opening 125 in the mounting post 129, thereby causing the fastener to move down toward the bottom of the elongated slot 109. Accordingly, the clamping bodies 102 and 103 move toward one another, such that the corresponding conductor receiving portions 105 and 126, and 106 and 128 engage one another, as shown in FIGS. 17 and 19. The corresponding grommets 157 engage one another to form conductor openings 176 and 177. The ribs 160 on the inner surfaces 158 facilitate securely retaining the conductors therein. The first retainer 121 on the fastener prevents the installation tool from engaging the lower portion 120 of the fastener. When the predetermined torque is obtained, the upper portion 118 of the fastener 110 separates from the lower portion 120, thereby preventing excess pressure from being exerted on the received conductors 26 and 27 (FIG. 1). The lower portion 120 of the fastener 110 allows the installation tool to loosen the fastener 110 when the spacer assembly 101 is to be opened. Loosening the fastener 110 moves the fastener up through the elongated slot 109 to an upper end thereof, as shown in FIG. 16.

The foregoing embodiment and advantages are merely exemplary and are not to be construed as limiting the scope of the present invention. The description of an exemplary embodiment of the present invention is intended to be illustrative, and not to limit the scope of the present invention. Various modifications, alternatives and variations will be apparent to those of ordinary skill in the art, and are intended to fall within the scope of the invention as defined in the appended claims and their equivalents.

What is claimed is:
1. A spacer assembly, comprising:
a first clamping body having a first conductor receiving portion, an upper surface, a protrusion extending from the upper surface, and a first slot formed in the protrusion having an elongated opening that extends in a first direction;
a second clamping body having a second conductor receiving portion aligned with the first conductor receiving portion, and a threaded opening; and
a fastener extending through the first slot in an axial direction different than the first direction and threadably engaging the threaded opening, wherein rotation of the fastener when it is threadably engaged with the threaded opening moves the first clamping body rela- tive to the second clamping body, adjusting the position of the fastener in the elongated opening,
wherein the protrusion is an isosceles trapezoid in cross section.

2. The spacer assembly according to claim 1, wherein
a tab extends outwardly from the first clamping body; and
a second slot extends longitudinally in the second clamping body, the second slot receiving the tab to further secure the first clamping body to the second clamping body.

3. The spacer assembly according to claim 1, wherein
a first tab extends outwardly from the first clamping body;
a first shoulder extends longitudinally on the second clamping body, the first shoulder receiving the first tab to further secure the first clamping body to the second clamping body.

4. The spacer assembly according to claim 3, wherein
a second tab extends outwardly from the second clamping body;
a second shoulder extends longitudinally on the first clamping body, the second shoulder receiving the second tab to further secure the first clamping body to the second clamping body.

5. The spacer assembly according to claim 1, wherein the protrusion tapers from the upper surface to a top portion.

6. The spacer assembly according to claim 1, wherein
a head portion of the fastener has an outer portion and an inner portion, said outer portion being separable from said inner portion when a predetermined torque is obtained during installation.

7. The spacer assembly according to claim 1, wherein a washer disposed on the fastener prevents removal of the fastener from said first slot in the first clamping body.

8. The spacer assembly according to claim 1, wherein the first conductor receiving portion and the second conductor receiving portion form a first cavity to receive a first conductor when the first clamping body and the second clamping body are connected and a grommet is positioned in the first cavity.

9. A spacer assembly, comprising: a first clamping body having a tapered protrusion extending upwardly from the first clamping body, a first slot is an elongated slot formed in the tapered protrusion, and a pin extending from the first clamping body; a second clamping body having a threaded opening and a second slot for receiving the pin; and a threaded fastener received by the first slot and the threaded opening to secure the first clamping body to the second clamping body such that rotation of the threaded fastener when it is threadably engaged with the threaded opening moves the first clamping body relative to the second clamping body, altering a position of the threaded fastener in the first slot and a position of the pin in the second slot wherein the second slot includes a first portion and a second portion, the second portion including a circumferential hole having a diameter larger than the first portion.

10. The spacer assembly according to claim 9, wherein the tapered protrusion is an isosceles trapezoid in cross section.

11. The spacer assembly according to claim 9, wherein the pin includes a shank having a first diameter and a head having a second diameter larger than the first diameter.

12. The spacer assembly according to claim 9, wherein a washer disposed on the threaded fastener prevents removal of the threaded fastener from said first slot in the first clamping body.

13. The spacer assembly according to claim 9, wherein a first conductor receiving portion extends downwardly from a first end of the first clamping body; a second conductor receiving portion extends upwardly from a second end of the first clamping body; a third conductor receiving portion extends downwardly from a first end of the second clamping body; a fourth conductor receiving portion extends upwardly from a second end of the second clamping body; the first conductor receiving portion and the third conductor receiving portion forming a first cavity to receive a first conductor and the first conductor receiving portion and the third conductor receiving portion forming a second cavity to receive a second conductor when the first clamping body and the second clamping body are connected.

14. A spacer assembly, comprising:
a first clamping body having a first conductor receiving portion, a first protrusion extending from an upper surface and at least partially defining a cavity, and a slot formed in the protrusion;
a second clamping body having a second conductor receiving portion aligned with the first conductor receiving portion, a second protrusion extending from the second clamping body into the cavity, and a threaded opening formed in the second protrusion; and
a fastener extending through the slot and threadably engaging the threaded opening, wherein rotation of the fastener when it is threadably engaged with the threaded opening moves the first clamping body relative to the second clamping body.

15. The spacer assembly according to claim 14, wherein the first protrusion and the second protrusion taper in a first direction.

16. The spacer assembly according to claim 14, wherein the first protrusion includes a first sidewall extending from the upper surface at an oblique angle and the slot is formed in the first sidewall.

17. The spacer assembly according to claim 16, wherein the second protrusion includes a second sidewall extending from the second clamping body at an oblique angle and the threaded opening is formed in the second sidewall.

18. The spacer assembly according to claim 14, wherein rotating the fastener in a first direction moves the first clamping body toward the second clamping body and rotating the fastener in a second direction moves the first clamping body away from the second clamping body.

* * * * *